Dec. 28, 1965   J. A. PAGE   3,225,717
DOUGH CURLING DEVICE
Filed March 27, 1962   5 Sheets-Sheet 1

INVENTOR.
JOHN A. PAGE
BY
Harold D. Jastram
ATTORNEY

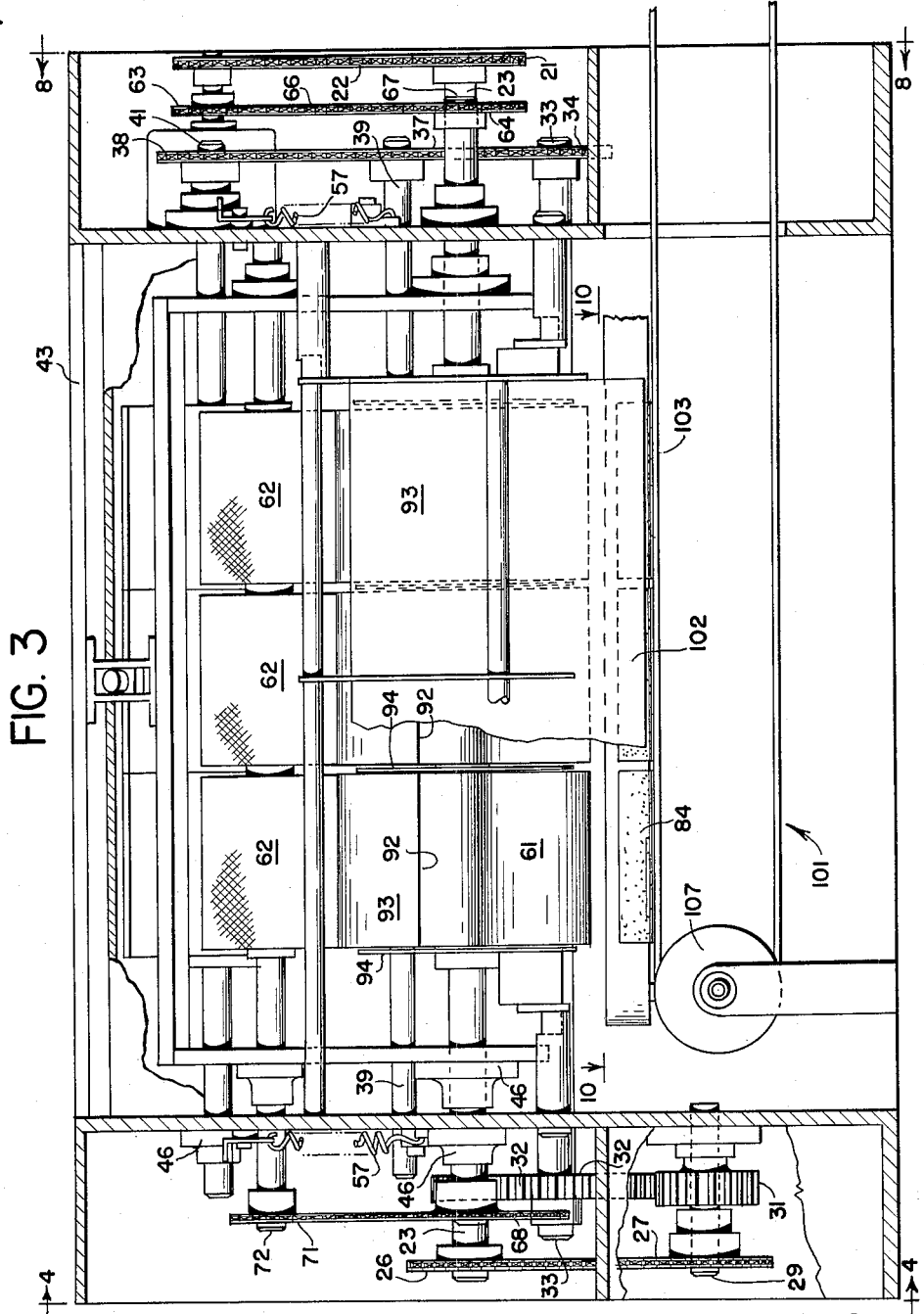

Dec. 28, 1965   J. A. PAGE   3,225,717
DOUGH CURLING DEVICE
Filed March 27, 1962   5 Sheets-Sheet 3

INVENTOR.
JOHN A. PAGE
BY
Harold D. Jastram
ATTORNEY

Dec. 28, 1965 J. A. PAGE 3,225,717
DOUGH CURLING DEVICE
Filed March 27, 1962 5 Sheets-Sheet 4

INVENTOR.
JOHN A. PAGE
BY
Harold D. Jastrow
ATTORNEY

Dec. 28, 1965  J. A. PAGE  3,225,717
DOUGH CURLING DEVICE
Filed March 27, 1962  5 Sheets-Sheet 5

INVENTOR.
JOHN A. PAGE
BY Harold D. Jastram
ATTORNEY

United States Patent Office 3,225,717
Patented Dec. 28, 1965

3,225,717
DOUGH CURLING DEVICE
John A. Page, Minneapolis, Minn., assignor to General
Mills, Inc., a corporation of Delaware
Filed Mar. 27, 1962, Ser. No. 182,730
5 Claims. (Cl. 107—69)

This invention relates to methods and apparatus for molding dough and more particularly to methods and apparatus for forming a cylinder of pastry dough which can be divided into individual rolls along score marks.

Problems of handling arise in the marketing of certain uncooked dough type products such as sweet rolls due to the fact that such products are normally marketed in the form of individual rolls. Packaging individual rolls by hand is a time consuming and expensive operation especially where large quantities of packaged products are needed with a number of rolls packed in each package.

It is therefore an object of the present invention to provide a new and improved method and apparatus for molding dough products.

Another object of the invention is to provide new and improved methods and apparatus for processing and packaging cylinders of pastry dough composed of individual rolls.

It is another object of the present invention to provide a new and improved method and apparatus for molding dough in the form of a cylinder.

Another object of the present invention is to provide methods and apparatus for forming a dough cylinder composed of a number of individual rolls.

A further object of the invention is to provide methods and apparatus for rolling sheets of dough into a cylindrical shape and for depositing the cylinders in end-to-end relationship for packaging.

Another object of the present invention is to provide methods and apparatus for scoring a dough sheet and subsequently rolling the sheet into a cylinder along the score lines to form a cylinder composed of individual rolls.

A further object of the invention is to provide an apparatus for forming cylinders of dough composed of individual rolls and for depositing the rolls in a conveyor in end-to-end, spaced relationship.

In one form of a new and improved apparatus for practicing the new method, a conveyor moves a sheet of pastry dough past a series of disc-like scoring blades or knives. The scoring discs or knives mark the sheet of dough along the length of the sheet as it is transported by the conveyor toward a first roller which is positioned near a set of cutting knives. The cutting knives are fixed on a rotary drum so that as the sheets of dough travel past the knives, the knives cut the dough into individual segments. The individual segments are then placed on a carrier drum where they are spaced by the drum prior to discharge. Next a dough segment engages a pocket drum which forces the leading edge of the segment into engagement with a rolling drum which together with the pocket drum and the carrier drum rolls the segment of pastry into a compact cylinder. A recess in the periphery of the pocket drum then captures the cylinder of dough and moves it past the rolling drum and deposits the cylinder on a conveyor adjacent the pocket drum. Several pocket drums on a common axis deposit a number of cylinders of dough in end-to-end relationship on the dough cylinder conveyor after which the conveyor moves the aligned cylinders of dough to a machine which packages the cylinders in suitable containers.

A complete understanding of this invention may be obtained from the following detailed description of methods and apparatus forming specific embodiments, when read in conjunction with the drawings in which;

FIGURE 3 is a more detailed end view of the apparatus shown in FIGURE 2 illustrating a rolling drum and a pocket drum together with various sprockets and gear mechanisms which drive the various drums;

Figure 1:
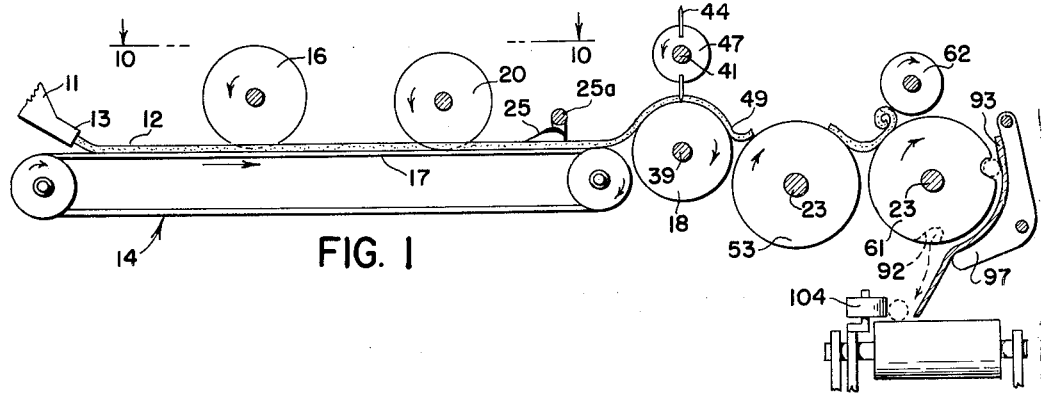
FIGURE 1 is a mechanical schematic of the apparatus showing an extruder, a conveyor which conveys a sheet of dough together with drums which process the dough to produce cylinders of pastry dough.

Refer first to FIGURE 1 of the drawings. An extruder 11 is utilized to form a continuous sheet of dough 12 of suitable thickness and width from which a series of cylinders of dough are produced. The pastry dough is extruded from an opening 13 of extruder 11 and is deposited on a belt conveyor 14. A belt conveyor 14 is used only for illustrative purposes, however various conveyor systems such as a series of rollers may be used in place of the conveyor illustrated. Conveyor 14 moves the sheet of dough 12 past a series of dough scoring discs (see also FIGURE 9) which are positioned very near the top surface of belt 17 of conveyor 14. As the dough moves between the discs 16 and the surface of belt 17, the scoring discs, which may have knurled edges or a series of notches to form a score mark 15 in the dough along the length of the dough (see FIGURES 5 and 9). This score mark 15 is placed in the dough in order that the finished cylinder may contain a number of individual rolls held together by a thin web 10 of dough. The individual rolls which are thus formed are of a desirable shape for the marketing of sweet rolls such as Danish rolls and are easily removable from the cylinder.

Figure 6:
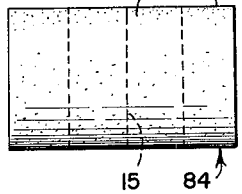
FIGURE 6 is a front view of a rolled cylinder of the dough illustrated in FIGURE 5.
Figure 9:
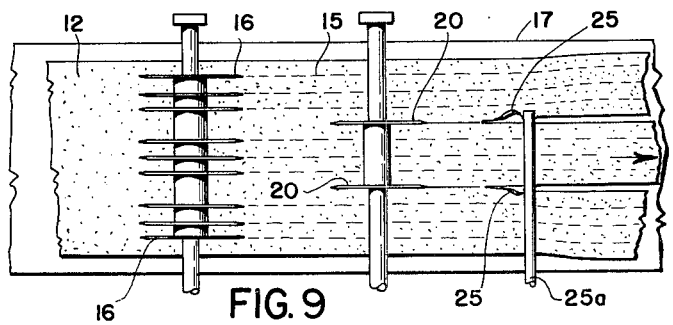
FIGURE 9 is a fragmentary top view of FIGURE 1 showing cutting knives and dough scoring discs.

After the sheet of dough 12 is scored, it is moved into engagement with a set of knives 20 which cut the sheet 12 as shown in FIGURE 9 so that the width of an individual scored sheet is exactly the length of a finished cylinder of dough illustrated in FIGURE 6. The knives 20 may be discs which engage the top surface of belt 17 to sever the dough sheet 12 as it engages the knives. The knives 20 may however be of any form that will properly sever the dough sheet 12.

Figure 8:
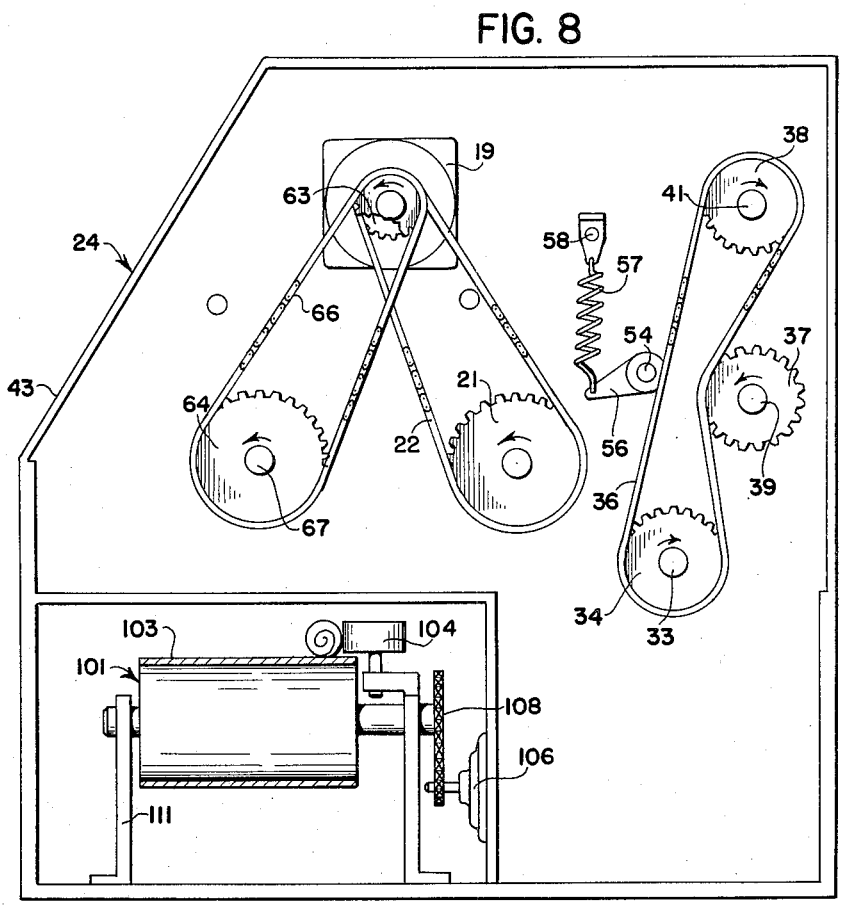
FIGURE 8 is a side view taken along lines 8—8 of FIGURE 3 showing the drive sprockets and gears which transmit power from a motor to the various drums of the apparatus.
Figure 11:
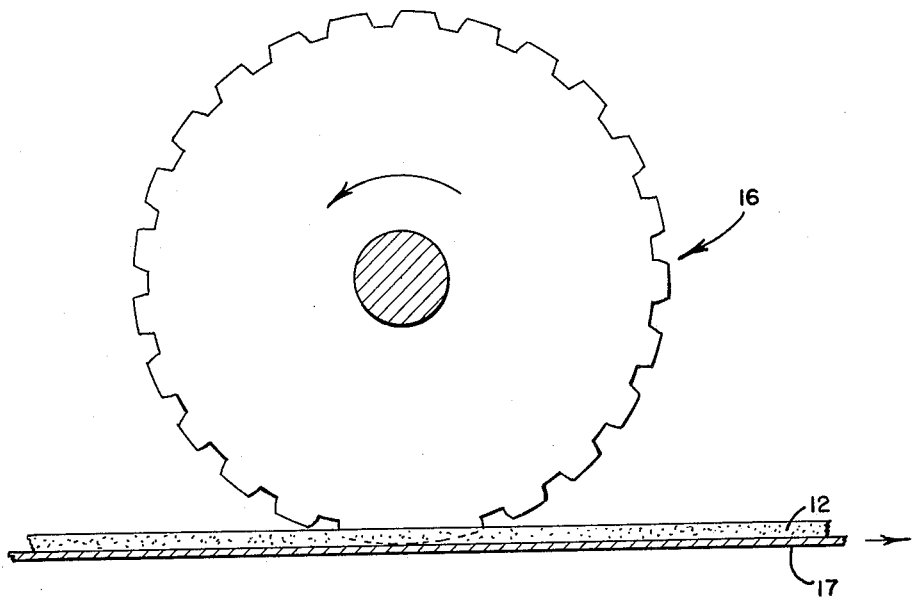
FIGURE 11 is a front view of a serrated disc illustrated in FIGURE 1.

After the sheet of dough 12 is properly scored and severed, the dough sheet is transported the length of conveyor 14 past dough plows 25 which separate the individual scored and severed sheets. Plows 25 are mounted above conveyor 14 by a shaft 25a. The individual sheets are then deposited on a carrier drum 18. Conveyor 14 is driven by a motor which is not shown through the usual gear or sprocket systems. A motor 19 (see FIGURE 8) rotates drum 18 in the clockwise direction as viewed in FIGURE 4 through a series of sprockets and gears disclosed by FIGURES 3, 4 and 8. Motor 19 drives sprocket 21 in the counterclockwise direction (see FIGURE 8), through chain 22. This rotary motion is transferred by shaft 23 to the opposite side (see FIGURE 4), of the machine 24. A sprocket 26 which drives chain 27 is connected to the shaft 23. Chain 27 drives sprocket 28, which in turn is connected to a shaft 29 upon which is mounted a spur gear 31 (see FIGURES 3 and 4). Spur gear 31 engages a second and larger spur gear 32 which is connected to shaft 33. Power is transferred by shaft 33 to the side of the apparatus 24 shown in FIGURE 8 where a sprocket 34 is connected to the shaft 33. Chain 36 engages sprockets 34, 37, and 38 which sprockets are connected to shafts 33, 39 and 41 respectively. Sprocket 37 is rotated in the counterclockwise direction as viewed in FIGURE 8 so that shaft 39 moves the attached drum 18 in the clockwise direction as viewed in FIGURE 4. Thus it can be seen that the rotating drum 18 picks up the sheet of dough 12 from conveyor 14 and moves the sheet of dough 12 toward rotating knives 44.

The various shafts are mounted in chassis 43 of the machine by bearing sleeves 46. These shafts and bearing mounting may be of a conventional design. If the machine is operated at high speed, it may be necessary that the bearing sleeves container roller or ball bearings to support the particular shafts, however, bearings such as nylon or babbitt bearings may be used if the machine operates at relatively low speeds. Thus the mounting of the bearings and sleeves is not described in detail in this application since there are a number of suitable methods whereby the shafts may be mounted to the chassis 43 of the machine, for instance the sleeves may be simply bolted to the chassis.

Figure 4:
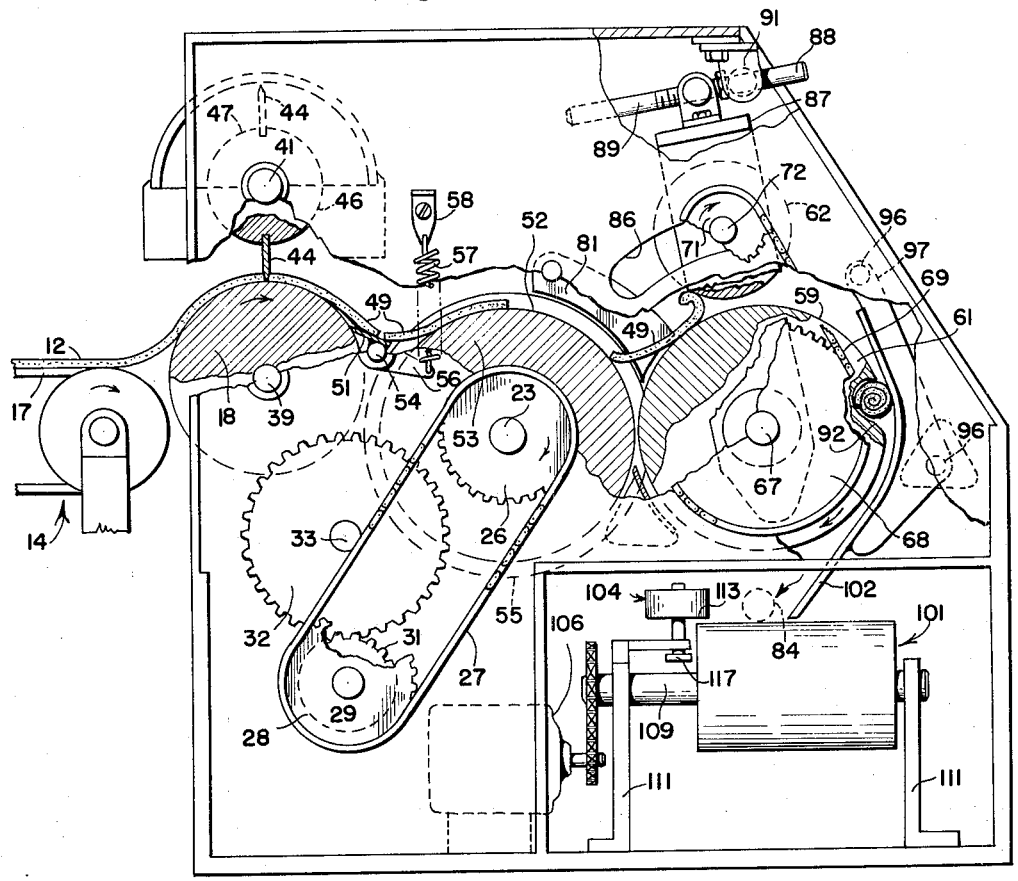
FIGURE 4 is a side view partially in section taken along lines 4—4 of FIGURE 3 showing the various drums together with the drive mechanisms.

A second set of cutting knives 44 is mounted in the periphery 46 of drum 47 (see FIGURE 4). When a segment of the dough sheet 12 of a predetermined length passes over the periphery of carrier drum 18, the knives 44 carried by drum 47 are rotated to the position shown in FIGURE 4 so that one of the knives engages the dough and severs the segment 49 from the dough sheet 12. Knife blades 44 are positioned in the periphery of drum 47 so that segment 49 is severed at right angles to the score marks 15 in the sheet of dough 12. The length of the segment 49 which is severed is controlled by the rate of travel of the dough sheet 12, the peripheral velocity of carrier drum 18, the spacing of the knives 44 and the angular velocity of drum 47. Any or all of these factors may be altered in order to produce a segment of dough of a length which can be successfully rolled and packaged. The rotation of the knives 44 is maintained in timed relationship with the rotation of pocket drum 61. As previously noted the drum 47 is driven by motor 19 which is connected to the drum through sprocket 38 and chain 36 (see FIGURE 8). An example of an alteration in the sprockets which may produce a difference in the length of the segment 49 would be the situation where the diameter of sprocket 38 is changed so that it is driven faster or slower depending on the change of diameter.

Figure 5:
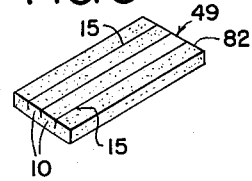
FIGURE 5 is an isometric view of a segment of scored dough.

The severed segment 49 appears as shown in FIGURE 5. The segment has a predetermined length as determind by the diameter of the finished product. The segment also contains the score marks 15 which were placed in the sheet by the scoring discs 16. A web 10 holds the various portions or individual rolls of the segment together. The web connection permits the segment to be handled for further processing and packaging and at the same time permits the individual portions of the segment to be removed from the finished dough cylinders.

A scraper 51 extends the length of carrier drum 18 and serves two functions. First it acts as a scraper to remove the leading edge of segment 49 from the carrier drum 18 in the event the segment sticks to the drum and additionally it acts as a guide to direct the segment 49 to the periphery 52 of a spacing drum 53. Scraper 51 is mounted on a shaft 54 to which is also mounted a pair of levers 56 (see FIGURES 4 and 8). Springs 57 are connected to the levers 56 and are anchored by brackets 58 to the chassis 43 of the machine. The springs 57 are under tension so that the levers 56 pivot about the shaft 54 to force scraper 51 into engagement with the periphery of carrier drum 18.

The segment 49 is deposited on the spacing drum 53 so that it is carried into engagement with rolling drums and also so that it can be spaced from subsequent segments which are severed from the dough sheet 12. Power is transferred directly from motor 19 to spacing drum 53 through chain 22, sprocket 21 and shaft 23. Since the diameter of drum 53 is greater than that of carrier drum 18 and since drum 53 is driven at a greater angular velocity than the carrier drum 18 due to a proper selection of gear ratios, the periphery 52 of spacing drum 53 is moving at a greater velocity than the periphery of drum 18. When the severed segment 49 contacts the periphery 52, the forward velocity is substantially increased thus carrying the segment away from the dough sheet at a rapid rate. The surface of drum 53 is very smooth so that the leading edge of the segment being severed will slip on the surface of drum 53 until knife 44 completely severs the dough sheet. Consequently the severed segment 49 is spaced from the next succeeding segment 49 which is cut. Spacing of the segments 49 can also be accomplished by simply increasing the angular velocity of drum 53 with the proper selection of drive gear ratios as noted to produce the desired spacing. Either method of spacing is satisfactory as they may be used in combination.

The dough segment moves along the periphery 52 of drum 53 until it engages the periphery 59 of pocket drum 61. Drums 53 are separated by rotary discs 55 which act as a moving guide for the dough segments. Spacing drum 53 is rotated in the clockwise direction as viewed in FIGURE 4 and pocket drum 61 is also rotating in the clockwise direction as viewed in that same figure. The leading edge of the dough segment 49 engages the periphery 59 and is forced upwardly by the movement of drum 61 until it engages curling drum 62. Motor 19 drives the curling drum 62 and pocket drum 61 through a sprocket and chain arrangement similar to that used in connection with the previously described mechanical system. A drive sprocket 63 which is connected to motor 19 drives sprocket 64 through a chain 66. Shaft 67 to which pocket drum 61 is rotated in the clockwise direction as viewed in FIGURE 4. Opposite the motor end of shaft 67 is a large sprocket 68 which is connected by a chain 69 to sprocket 71. Sprocket 71 is attached to shaft 72 to which curling drum 62 is attached. Chain 69 and sprocket 71 drive the curling drum 62 in the clockwise direction as viewed in FIGURE 4 to attain the direction of rotation necessary to roll segment 49 along its length. Again note that the sprockets and shafts are connected to the chassis of the machine in a conventional manner through bearing sleeves or other means.

Dough guides 81 are positioned on either side of the dough segment 49 so that the segment 49 moves in the proper direction about the peripheries of the various drums.

Figure 7:
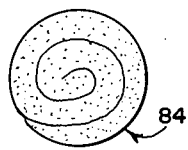
FIGURE 7 is an end view of the dough cylinder illustrated in FIGURE 6.

The leading edge of the dough segment 49 is engaged by the periphery of curling drum 62 and is turned back upon the marked or scored portion of the segment thus rolling the segment 49 into a cylinder similar to that illustrated in FIGURES 6 and 7. The rolling takes place through the cooperation of spacing drum 53, pocket drum 61 and curling drum 62. The surfaces of drums 61 and 62 ideally are knurled or otherwise roughened so that the roughened surface will provide positive manipulation of the segment 49. Curling drum 62 continuously turns the dough segment back upon itself while the rotary motion of spacing drum 53 and pocket drum 61 continuously forces the segment 49 into engagement with the curling drum. Curling drum 62 engages the leading edge 82 of the dough segment 49 so that as the segment 49 is being rolled, the segment is rolled back upon itself along lines 15. When this rolling is properly accomplished a cylinder of dough similar to that illustrated in FIGURE 6 is produced. Note that in FIGURE 6 the score marks 15 of a properly rolled segment divide the segment 49 into individual rolls 83 each of which has the appearance of a rolled sweet roll illustrated in FIGURE 7. The individual rolls 83 are secured in a compact cylindrical shape 84 by a thin web 10 of material which is not severed by the scoring discs 16. The cylinder of dough 84 as it is removed from a package by a consumer is easily divided into individual rolls 83 since the thin web of material permits removal of each roll 83 from the remainder of the cylinder.

The compactness with which the segment 49 may be rolled can be adjusted by changing the relative position of curling drum 62 with respect to the spacing and pocket drums. Shaft 72 which carries drum 62 is mounted on a movable mount which slides in a slot 86. The shaft 72 is mounted in a bracket 87 which is pivoted about shaft 67. This pivot point insures that drum 62 will move along an arc which has the same curvature as the periphery of pocket drum 61 thus insuring proper rolling characteristics of the cooperating curling and pocket drums. If a more compact cylinder of dough is desired, curling drum 62 is moved along slot 86 toward spacing drum 53. This movement is accomplished by screwing adjustment rod 88 into channel 89. Bracket 87 is rigidly connected to spacing rod 88 so that the top of bracket 87 is forced to rotate in the counterclockwise direction as viewed in FIGURE 4 thus moving curling drum 62 toward spacing drum 33. Spacing rod 88 is guided and held in position by a bracket 91 which is attached to the chassis 43 of the machine.

Pocket drum 61 contains an elongated recess or pocket 92 which forms part of the periphery of drum 61 and extends along the length of the drum parallel to the shaft 67. After the segment 49 is rolled, the pocket 92 rotates into engagement with the cylinder of dough and captures it by permitting the dough cylinder to drop into the pocket 92. Further rotation of pocket drum 61 moves the captured cylinder of dough past the curling drum 62. A dough guide 93 which conforms to the periphery of drum 61 holds the cylinder of dough in pocket 92 until the drum 61 moves cylinder 92 to a discharge position where the cylinder of dough drops from the pocket 92 under the influence of gravity.

The dough guides 93 are held in place by ribs 97 which are connected to shafts 96. The shafts 96 are rigidly fastened to the chassis 43 of the machine.

Drum spacers 94 are provided to separate a series of similar pocket drums 61. The spacers 94 act as a guide for preventing axial movement of the cylinder of dough as it is transported in pocket 92 of drum 61.

Figure 10:
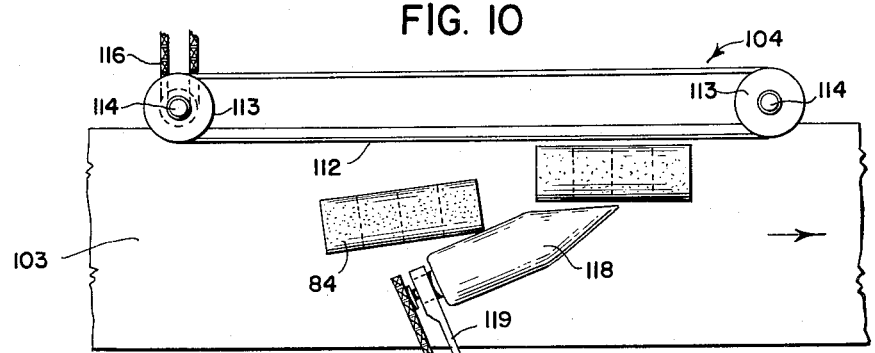
FIGURE 10 is a fragmentary top view of a conveyor taken along lines 10—10 of FIGURE 3 showing a conveyor with apparatus for aligning dough cylinders.

The cylinders of dough 84 are deposited on conveyor 101. In order to prevent unrolling of the cylinders, a slide 102 is attached to the guide 93. The slide 102 is composed of rubber, flexible plastic or some similar material so that it may rest in contact with the belt 103 of the conveyor. This slide 102 is used since the dough cylinders have a tendency to unroll as they strike the conveyor belt 103 with a great deal of force and additionally the guide 102 directs the cylinders to one side of the conveyor 101 to aid alignment of the individual cylinders. Simply dropping the cylinders 84 on the conveyor 101 may also damage the cylinders to such an extent that packaging of the cylinders would be difficult if not impossible. The cylinders of dough 84 slide down the guide 102 and if the cylinders are moving fast enough they will come to rest against dough guide 104. Dough guide 104 is best illustrated in FIGURE 10 where it is evident that the guide is actually a belt-type conveyor oriented perpendicular to the surface of belt 103. Since the cylinders of dough 84 are to be packed in cylindrical containers which are very nearly of the same diameter as the dough cylinders, it is imperative that the individual dough cylinders be axially aligned on conveyor 101 prior to packaging. Consequently, dough guide 104 is utilized to form a barrier for aligning the dough cylinders. The belt 103 of conveyor 101 is driven on pulleys 107 by motor 106 through a gear system 108. The pulleys 107 are connected to the gear system by a shaft 109 which is mounted on frame 111.

As the conveyor 101 moves the cylinders of dough to the right as viewed in FIGURES 3 and 10, the dough cylinders may contact belt 112 of guide 104. In order to avoid damage to the cylinders of dough due to frictional engagement between the cylinders 84 and the surface of the dough guide 104, a conveyor system with belt 112 driven at the same velocity as belt 103 and consequently cylinder 84 is used as the guide. Belt 112 is driven in the usual manner by suitable pulleys 113 and a drive means such as an electric motor which is not illustrated. Pulleys 113 are mounted for rotation on shafts 114 which are mounted on frame 111 (see FIGURE 4). A motor which is not shown is connected through a chain 116 to sprocket 117.

Quite often the dough cylinders 84 do not engage belt 112 as they are deposited from the pocket drum 61 so that some means is necessary to force the dough cylinders 84 into contact with belt 112. For this purpose a bullet shaped roller 118 is positioned over the surface of conveyor belt 103 as shown in FIGURE 10. The roller 118 is mounted on a cantilever-type arm 119 over the belt 103 and is driven by a motor which is not illustrated through a sprocket and chain system 121. Roller 118 is rotated in the counterclockwise direction as viewed from its tapered end in FIGURE 10. When an unaligned cylinder 84 engages the surface of roller 118, the rotating cylinder moves the leading end of the cylinder toward belt 112. Since the axis of roller 118 is positioned across the direction of travel of the cylinder 84, the rotating roller 118 moves the leading end of cylinder 84 toward belt 112 and progressively aligns the remainder of the cylinder until the entire cylinder engages the surface of belt 112. This alignment as noted before is desirable to insure efficient packaging of the cylinders since the packaging machine is precisely timed with the movement of the cylinders 84 and must be aligned to receive cylinder 84 from a predetermined position from the conveyor belt 103.

In FIGURE 3 it is noted that a series of three curling drums 62 and a similar series of three pocket drums 61 are provided for rolling and depositing cylinders of dough. Since these rollers are continuously producing cylinders of dough, some synchronization of the entire mechanism is necessary in order to insure efficient operation. The individual cylinders of dough 84 must be deposited on conveyor 101 in such a manner that cylinders discharged from one of the pocket drums do not interfere with cylinders discharged from an adjacent pocket drum. If each of the pocket drums discharge dough cylinders simultaneously, the velocity of the surface of belt 103 must be great enough to move a series of three deposited cylinders 84 along the belt prior to deposition of a second series of three cylinders. This timed relationship between the deposition of cylinders of dough 84 with respect to the movement of the belt 103 can be accomplished by selecting the proper gear ratios and sprocket diameters of the previously described drive means. In any case some synchronization should exist between the deposition of the cylinders 84 and the axial movement of the cylinders along conveyor 101. In the instant apparatus the location of pocket 92 in each of the drums 61 is on the same axis in each drum 61, however, this precise arrangement is not necessary since the pockets 92 of the individual drums 61 may be offset from one another so that cylinders of dough 84 are successively deposited from drums 61 rather than simultaneously deposited from the series of drums 61. This provides a means of adjusting the spacing between dough cylinders on conveyor 101. Again note that there is a synchronization problem involved in aligning the deposited cylinders. However, these problems can be solved by conventional means such as selecting proper gear ratios and sprocket drive diameters.

Figure 2:
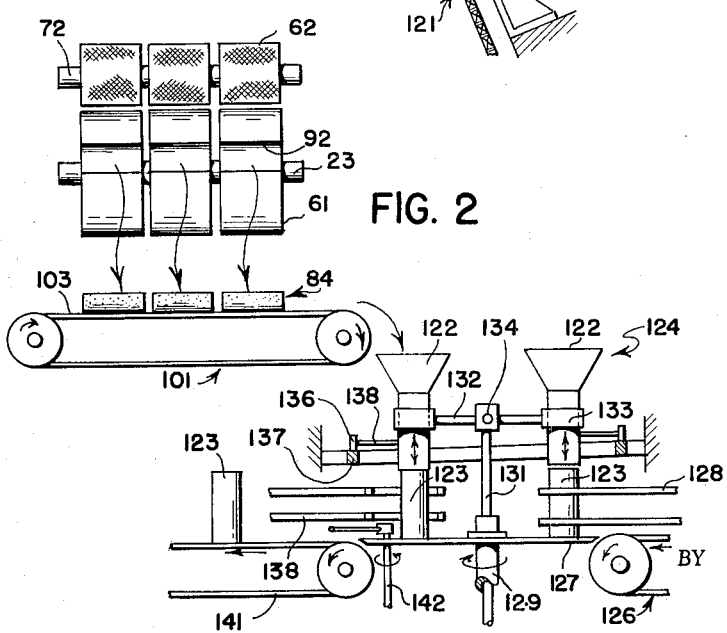
FIGURE 2 is a mechanical schematic of a right end view of FIGURE 1 showing the drums together with a conveyor form moving dough cylinders to a packaging machine.

Next refer to FIGURE 2 of the drawings. The cylinders of dough 84 are conveyed the length of conveyor 101 where they are individually deposited in individual funnels 122. Containers 123 are supplied to the packaging machine 124 by a conveyor 126. The containers are guided onto a rotary carrier 127 by guides 128. The rotary carrier 127 is mounted for rotation on a shaft 129. The individual funnels are rotated with the carrier 127. The funnels 124 are connected to a shaft 131 by arms 132 and clamps 133. The individual arms 132 are mounted in a connector 134 so that the arms can move vertically with funnels 122 as the funnels are moved vertically through the action of a cam follower 136 which is following a cam surface 137. Connector 134 may be a universal type connection or it may be a simple connecting rod type arrangement as long as vertical movement of arm 132 is accomplished. Cam follower 136 is attached to funnel 122 by arm 138. As the funnels 122 are rotated or indexed with the carrier 127, the follower 136 travels along the surface of cam 137. When the funnel is indexed closest to conveyor 126, the cam follower 136 moves the funnel 122 vertically upward so that it will not engage a container 123 which is being loaded on the carrier 127 from the conveyor 126. This motion is accomplished if the surface of the cam 137 at this point is of the proper shape to move the follower 136 vertically upward as viewed in FIGURE 2. The container 123 is aligned under the funnel 122 by means which are not shown after which the carrier 127 and funnel 122 are moved about the axis of shaft 131 to a new position. As cam follower 136 moves along the surface of cam 137 with the container and funnel, the altered shape of the cam permits the cam follower to move vertically downward thus positioning the funnel 122 over the mouth of the container 123. The funnel and associated container 123 are then moved to the load position adjacent conveyor 101 where a cylinder of dough 84 is deposited as indicated by the arrow in FIGURE 2 in the container 123.

Further indexing or rotation of the carrier 127 and funnel 122 carries the container adjacent the discharge conveyor 141 where a discharge assist 142 moves the container 123 onto the conveyor 141. The container with the cylinder of dough is then moved to a subsequent processing station. Guides 138 are provided along conveyor 141 to facilitate alignment of the container 123 on the conveyor.

From this it can be seen that spacing and alignment of the series of dough cylinders 84 is desirable when the cylinders are deposited on conveyor 101 from pocket drums 61. Since the packaging machine 124 is operated as an indexed apparatus, alignment and spacing of the individual cylinders 84 is desirable to accomplish efficient packaging of the product. The synchronization of the machine as a whole is accomplished as noted by simply selecting proper gear ratios, sprocket diameters and drive motor speeds.

It is to be understood that the above described arrangements are simply illustrative of the application of the principles of the invention. Numerous other arrangements may be readily devised by those skilled in the art which will employ the principles of the invention and fall within the spirit and scope thereof.

Now therefore I claim:

1. An apparatus for molding dough cylinders from a sheet of pastry dough which comprises means for scoring said sheet along its length to produce a score mark, means for severing a segment of dough from said sheet, means for engaging an edge of said segment to turn said segment back upon itself along said score mark to form a cylinder of dough and a drum having a pocket for capturing a cylinder of dough and for discharging said cylinder of dough out of engagement with said engaging means.

2. An apparatus for molding dough cylinders from a sheet of pastry dough which comprises means for conveying said sheet, means in close proximity to said conveying means for scoring said sheet to produce a score mark, means associated with said conveying means for severing a segment of said sheet as said sheet is discharged from said conveying means, means for engaging a leading edge of said segment to roll said segment into a cylinder of dough along said score mark, means for directing said leading edge into engagement with said engaging means and for discharging said cylinder of dough and a spacing drum interposed between said severing means and said directing means to space said segment from successively severed segments.

3. An apparatus in accordance with claim 2 in which said directing means is a rotary drum with a pocket in the periphery for capturing said cylinder of dough and which further includes means for synchronizing the rotation of said rotary drum and said spacing drum to insure synchronization of the spacing of said segments with the peripheral location of said pocket.

4. A method of processing pastry dough which comprises extruding a sheet of dough, moving said sheet into engagement with a scoring knife, scoring said dough to form a mark along the length of the dough, severing said sheet perpendicular to said mark to form a segment of dough, spacing a number of said segments at predetermined intervals, rolling said segments along said mark to form a cylinder of dough, and then depositing a series of said cylinders in end to end relationship at predetermined intervals on a conveyor.

5. An apparatus for molding dough which comprises a first conveyor, means for depositing a continuous sheet of dough on said first conveyor, means in close proximity to said first conveyor for scoring said sheet to produce score marks the length of said sheet, means associated with said first conveyor for severing segments of said sheet at right angles to said score marks, means for engaging an edge of each segment to roll said segment into a cylinder of dough, a second conveyor, and means for capturing said cylinder of dough and for depositing a series of said cylinders in end-to-end relationship on said second conveyor.

References Cited by the Examiner

UNITED STATES PATENTS

| | | | |
|---|---|---|---|
| 719,116 | 1/1903 | Hueg | 107—9.4 |
| 1,120,270 | 12/1914 | Brussolo | 107—4 |
| 1,126,606 | 1/1915 | Wolf | 107—4.3 |
| 1,454,672 | 5/1923 | Fetaz | 107—9.4 |
| 2,756,459 | 7/1956 | Kellner | 107—69 X |
| 2,951,456 | 9/1960 | Olgiati | 107—4.2 |

WALTER A. SCHEEL, *Primary Examiner.*

CHARLES A. WILLMUTH, *Examiner.*